US012800740B2

(12) United States Patent
Massa et al.

(10) Patent No.: US 12,800,740 B2
(45) Date of Patent: Nov. 17, 2026

(54) POSITION DETECTION IN HOSTILE ENVIRONMENT USING REFLECTED RADIATED ENERGY

(71) Applicant: MASSA Products Corporation, Hingham, MA (US)

(72) Inventors: Donald P. Massa, Scituate, MA (US); Dawn F. Stancavish, Marshfield, MA (US); Algis E. Karosas, Stowe, VT (US); Joseph P. Donahue, Marshfield, MA (US); Christopher R. Johnson, Weymouth, MA (US)

(73) Assignee: MASSA Products Corporation, Hingham, MA (US)

( * ) Notice: Subject to any disclaimer, the term of this patent is extended or adjusted under 35 U.S.C. 154(b) by 0 days.

(21) Appl. No.: 18/769,288

(22) Filed: Jul. 10, 2024

(65) Prior Publication Data

US 2024/0369693 A1 Nov. 7, 2024

Related U.S. Application Data

(63) Continuation of application No. PCT/US2022/039342, filed on Aug. 3, 2022.

(51) Int. Cl.
*G01S 7/521* (2006.01)
*F22B 37/78* (2006.01)
(Continued)

(52) U.S. Cl.
CPC .............. *G01S 7/521* (2013.01); *F22B 37/78* (2013.01); *G01F 23/2962* (2013.01); *G01S 15/101* (2013.01)

(58) Field of Classification Search
CPC .... G01S 7/521; G01S 15/101; G01F 23/2962; F22B 37/78
(Continued)

(56) References Cited

U.S. PATENT DOCUMENTS 4,480,468 A * 11/1984 Sinha .................... F17C 13/021 73/290 V
5,038,611 A * 8/1991 Weldon ............... G01F 23/2962 377/25

(Continued)

FOREIGN PATENT DOCUMENTS

CN 106986633 A * 7/2017 ............. C04B 35/49
CN 209043423 6/2019

(Continued)

OTHER PUBLICATIONS

Machine translation of CN-106986633-A (Year: 2017).*

(Continued)

*Primary Examiner* — John E Breene
(74) *Attorney, Agent, or Firm* — Kristofer E. Elbing

(57) ABSTRACT

Disclosed in one aspect is an echo-ranging sensor system that gives reliable and accurate measurements when used in high-temperature(s), high-pressure(s), and over all hostile environment(s). An example of a novel application is for sensing, monitoring, and controlling water level measurement in boilers where the environment is extremely challenging and caustic. Although disclosed systems are not limited to the ultrasonic frequency range, many applications in which they will most likely be used would work best with transducers that operate at ultrasonic frequencies. This disclosure includes a robust and optimized mechanical and electronic design for mounting, and a design for transducers that are thermally matched and allow transmission and reception of energy with precision in harsh environments and can also be used with a controller. The system performs in high-temperature, high-pressure, and can withstand extreme conditions, such as boiling water, steam, and other gaseous substances and caustic chemicals.

19 Claims, 8 Drawing Sheets

(51) Int. Cl.
*G01F 23/2962* (2022.01)
*G01S 15/10* (2006.01)

(58) Field of Classification Search
USPC .................................................. 73/632, 290 V
See application file for complete search history.

(56) References Cited

U.S. PATENT DOCUMENTS

| | | | | |
|---|---|---|---|---|
| 5,184,510 | A * | 2/1993 | Rossman | G01F 23/28 73/290 V |
| 5,337,289 | A | 8/1994 | Fasching | |
| 6,246,154 | B1 * | 6/2001 | Gluszyk et al. | H01L 41/053 310/324 |
| 7,168,314 | B2 * | 1/2007 | Voss | G01F 23/296 73/290 V |
| 7,409,301 | B2 | 8/2008 | Tynkov | |
| 10,678,200 | B2 | 6/2020 | Matsuoka et al. | |
| 2012/0197555 | A1 | 8/2012 | Cheng et al. | |
| 2014/0116535 | A1 * | 5/2014 | Tix et al. | F17D 3/00 137/334 |
| 2014/0318480 | A1 | 10/2014 | Liu et al. | |
| 2015/0316509 | A1 | 11/2015 | Oguma et al. | |
| 2021/0223769 | A1 | 7/2021 | Khalate et al. | |

FOREIGN PATENT DOCUMENTS

| | | | |
|---|---|---|---|
| CN | 210688719 U | * | 6/2020 |
| CN | 113418580 | | 9/2021 |
| JP | 2020016589 | | 1/2020 |
| JP | 202009110 | | 6/2020 |
| WO | 0235206 | | 5/2002 |
| WO | 2024030128 | | 2/2024 |
| WO | 2024030129 | | 2/2024 |

OTHER PUBLICATIONS

Machine translation of CN 210688719 (Year: 2020).*

US Serial No. PCT/US22/39338, International Search Report, Dated Nov. 7, 2022 (Year: 2022).*

U.S. Serial No. PCT/US22/39342; International Search Report, dated Dec. 20, 2022.

Columbia Research Laboratories, Inc., "567M7 High Intensity Acoustic Sensor", [online] 2016; Retreived from the internet Nov. 17, 2022. url:https://www.crisensors.com/product.cfm??cat=dynamic-pressure-sensors&sub=high-intnesity-acoustic-sensors&prod=567m7; pp. 1-4.

Extended European Search Report, EP22954160.1, Dated Jul. 13, 2026.

* cited by examiner

POSITION DETECTION IN HOSTILE ENVIRONMENT USING REFLECTED RADIATED ENERGY

CROSS-REFERENCE TO RELATED APPLICATION

This application is a continuation of PCT Patent Application No. PCT/US2022/039342, filed on Aug. 3, 2022 which is herein incorporated by reference in its entirety.

FIELD OF THE INVENTION

The invention relates to improvements in echo-ranging systems and their transducers in hostile environments, including ultrasonic position measuring systems for use in high-temperature and/or high-pressure environments, such as boilers.

BACKGROUND OF THE INVENTION

Prior art boiler control and monitoring systems have used different types of sensor mechanisms, such as floats or capacitance probes, to measure the water level in the boiler. These types of sensors can be unreliable when used in the harsh environment of a steam boiler. The corrosive conditions of the gaseous environment and the dirty nature of the water can cause these sensors to corrode and the floats to jam and stop moving.

SUMMARY OF THE INVENTION

This invention provides novel position detection systems that can be used in high-temperature and/or high pressure environments, such as in boilers. According to one aspect the invention, a novel design of a non-contact ultrasonic echo-ranging system is proposed that does not have any part of the sensing system in the water, will be reliable for use in the hostile environment, and will produce improved and accurate water level measurement in a boiler. The transducers might also need to survive being flooded with water or other liquids.

Although systems according to the invention are not limited to the ultrasonic frequency range, many applications in which this invention will most likely be used would work best with transducers that operate at ultrasonic frequencies. The teachings of this invention can be used to detect and measure the distance of objects and surfaces from the transducers in many different types of hostile environments, such as measuring liquid levels in pressurized storage tanks, or the distance to a piston in a machine. There is however a particular need to measure and control the level of water in boilers.

In one general aspect, the invention features, in a distance measuring system, electronic means and electroacoustic hardware means, said electroacoustic hardware means capable of operating in high-pressure and/or high temperature, said electroacoustics hardware containing transmit transducer means, mounted in a known location, for radiating an acoustical signal into a gaseous environment after receiving a transmit excitation signal from said electronics means, receiving transducer means, which could be the same instrument as the transmit transducer, also mounted in a known location, for receiving an echo from said acoustic signal after it reflects from the surface of an object or substance in the gaseous medium, and turning said acoustic signal into an electronic signal, said electronic hardware having means capable of detecting said received echo electronic signal and means to measure the time from when said transmit excitation signal was sent until when said echo signal was received, and means for calculating the location of the reflecting object or substance using the known location of the transmitting and receiving transducer and the speed of sound.

In another general aspect, the invention features an apparatus for measuring a distance from a surface in a high-temperature and/or high-pressure environment that includes an ultrasonic transmitting element portion constructed to withstand high pressure and/or high temperature, and positioned to direct ultrasonic energy along a distance measurement transduction direction, an ultrasonic receiving element portion constructed to withstand high pressure and/or high temperature, and positioned to receive ultrasonic energy from the ultrasonic transmitting element reflected back along a distance measurement reception direction, and a processing system responsive to the receiving element portion and operative to derive a surface distance measurement signal for the liquid based on the ultrasonic energy reflected back from the surface of the liquid.

In preferred embodiments the ultrasonic transmitting element portion and the ultrasonic receiving element portion can be part of a same transducer. The ultrasonic transmitting element portion can be part of an ultrasonic transmitting transducer with the ultrasonic receiving element portion being part of an ultrasonic transmitting receiver. The apparatus can further include ultrasound-reflecting target positioned within the high-temperature and/or high-pressure environment to allow the processing system to measure the speed of sound within the high-temperature and/or pressure environment. The environment can exhibit a temperature that is at least about as hot as boiling water under standard atmospheric conditions and wherein steam is present in the environment. The environment can exhibit a temperature that can exceed about 300 F. The environment can exhibit a temperature that can exceed about 400 F. The environment can exhibit a temperature that substantially exceeds that of sustainable human living conditions. The environment can exhibit a pressure that can substantially exceed atmospheric conditions. The environment can exhibit a pressure that can substantially exceed 100 psig. The environment can exhibit a pressure that can exceed about 150 psig. The transmitting and receiving element portions include materials with matched thermal coefficients. The apparatus can further include a stilling tube through which at least some of the ultrasonic energy passes. The receiving element portions can be mounted in a plug fit with a plurality of o-rings.

In a further general aspect, the invention features a method of measuring a distance from a surface in a high-temperature, high-pressure environment, that includes providing an ultrasonic transmitting element portion constructed to withstand high pressure and/or high temperature, and positioned to direct ultrasonic energy along a distance measurement transduction direction, providing an ultrasonic receiving element portion constructed to withstand high pressure and/or high temperature, and positioned to receive ultrasonic energy from the ultrasonic transmitting element reflected back along a distance measurement reception direction, transmitting an ultrasonic pulse with the ultrasonic transducing element portion, receiving reflected energy from the ultrasonic pulse after it has reflected back from a surface of the liquid, and deriving a liquid level measurement for the liquid based on the energy reflected back from the surface of the liquid. In preferred embodiments, the method can be performed in an operating boiler.

In another general aspect, the invention features a transducer that includes a transduction material having a first coefficient of expansion, a structural material having a second coefficient of expansion, an adhesive to bond the transduction material to the structural material, and wherein the first coefficient of expansion is sufficiently close to the second coefficient of expansion to preserve the integrity of the adhesive bond. In preferred embodiments the transducer can be a quarter-wavelength ultrasonic transducer.

Systems according to the aspects of invention can be advantageous in that they can provide a non-contact echo-ranging system that can operate in hostile environments, such as steam, high temperatures, and/or high pressures, and will accurately measure the distance to an object in front of the sensing transducers.

Systems according to the aspects of invention can be advantageous in that they can provide an ultrasonic non-contact echo-ranging system that can operate in the hostile environment of a boiler consisting of high temperatures, high pressures, and steam, and it will accurately measure the water level in the boiler.

Systems according to the aspects of invention can be advantageous in that they can provide means for accurately measuring the speed of sound in the acoustic environment to assure that the water level measurement are accurate while the speed of sound in the acoustic environment is continually changing.

Systems according to the aspects of invention can be advantageous in that they can provide ultrasonic transducers that can withstand the high temperatures, pressures, and the hostile boiler steam environment, and can also survive being submerged in the boiler's water.

Systems according to the aspects of invention can be advantageous in that they can provide mounting means that allows the transducers to be attached to a high-pressure flange and have low pressure inside the transducer and allow wires from the transducer that are then attached to the electronics to be in low pressure.

Systems according to the aspects of invention can be advantageous in that they can have the sensor system communicate the measured water level to a controller that can then use this information to manage the water level in the boiler and perform alarm functions and safety responses if the water level is too low.

BRIEF DESCRIPTION OF THE DRAWINGS

The novel features which are characteristic of the invention are set forth with particularity in the appended claims. However, the invention itself, both as to its organization and method of operating, together with further objects and advantages thereof, will best be understood by reference to the description when taken in conjunction with the accompanying drawings in which:

DESCRIPTION OF AN ILLUSTRATIVE PREFERRED EMBODIMENT

Figure 1:
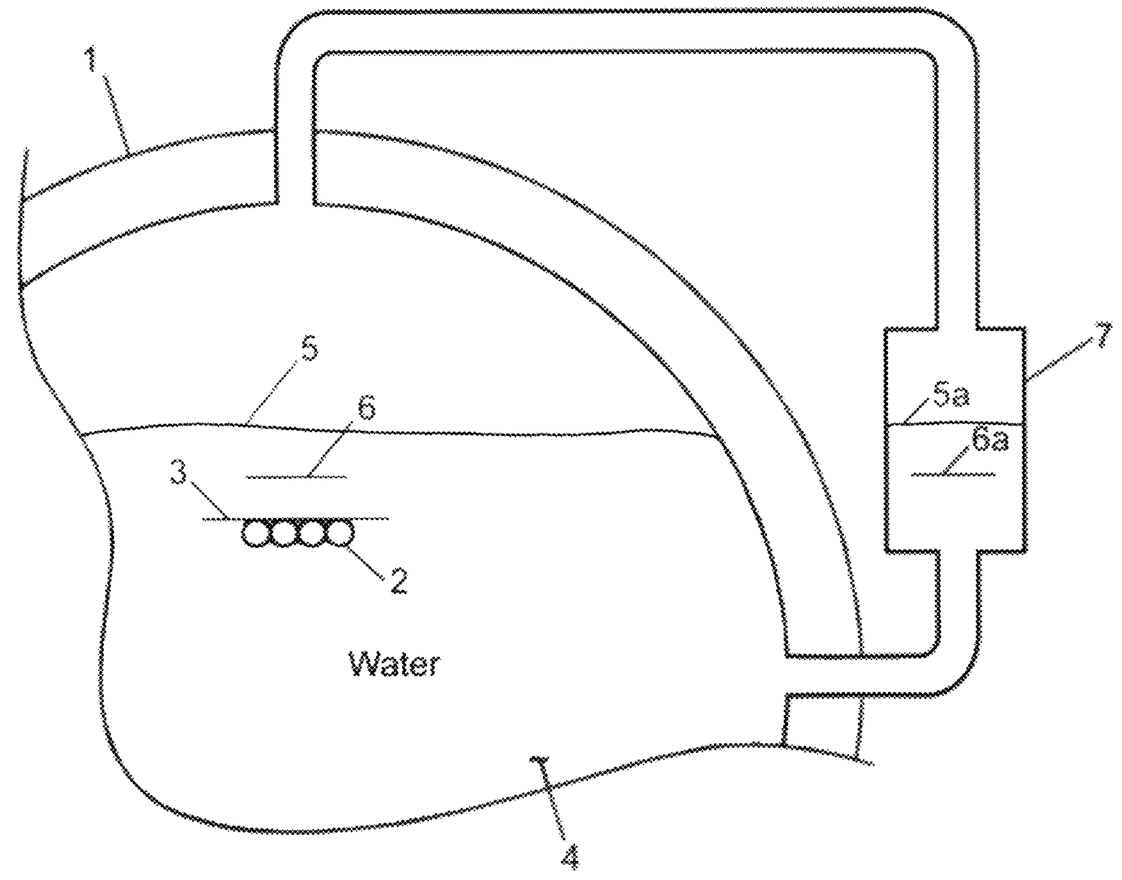
FIG. 1 is a schematic drawing showing a conceptual cutaway overview of a boiler and how a high-pressure water level sensor housing, such as shown in FIG. 7, could be connected.

FIG. 1 shows a cutaway schematic drawing of a conceptual overview of a steam boiler. This could be any of the boilers that are currently used in the industry that could use this invention, such as a water tube or firetube boiler. It is noted that the particular type or shape of the boiler is not critical. An outer pressure wall 1 encapsulates a number of heating tubes 2. The top of the heating tubes 2 is defined by line 3. During operation, the inside of the boiler is partially filled with water 4. The boiler heats the heating tubes 2, which in turn heats the water. As the water gets hotter, it produces steam, which then increased the pressure in the gaseous environment above the water surface 5. For safety reasons, water level 5 cannot be allowed to drop below line 3, the top of heating tubes 2. A low water cutoff (LWCO) level 6 is set at a height slightly above the top of heating tubes 3.

A water level monitoring and control system for a boiler should be capable of reliably and accurately measuring the level of the surface of the water 5. It should then be able to determine if the water level 5 is above or below the LWCO 6. If the water level 5 falls below LWCO 6, required alarms will be activated, and the heat to the heating tubes 2 will be shut off (except during certain supervised operations, such as blowdown). In addition, the water level monitoring and control system should be able to perform other level control functions, such as allowing an operator to define a minimum and maximum range for the water level to be maintained. The system would then add water to the boiler if the water level 5 drops below the minimum value. The system should also have a high water alarm level set. If water level 5 rises above the preset high water alarm level, the appropriate alarms will be activated. Many different types of additional control features can readily be added to this invention system by anyone skilled in the art, and still fall within the true spirit and scope of this invention.

FIG. 1 also schematically shows one method of attaching a water level sensor housing 7 to the boiler. Housing 7 is plumbed into the boiler in a manner that will allow the water in the boiler to easily flow into it. Therefore, the water level 5*a* in housing 7 is the same level as the water level 5 in the boiler. In addition, level line 6*a* is at the same level as the LWCO level 6 inside the boiler. The high-pressure acoustic portions of the level sensor of this invention can be readily mounted inside the water level sensor housing 7 to monitor and control the water level in the boiler.

Figure 2:
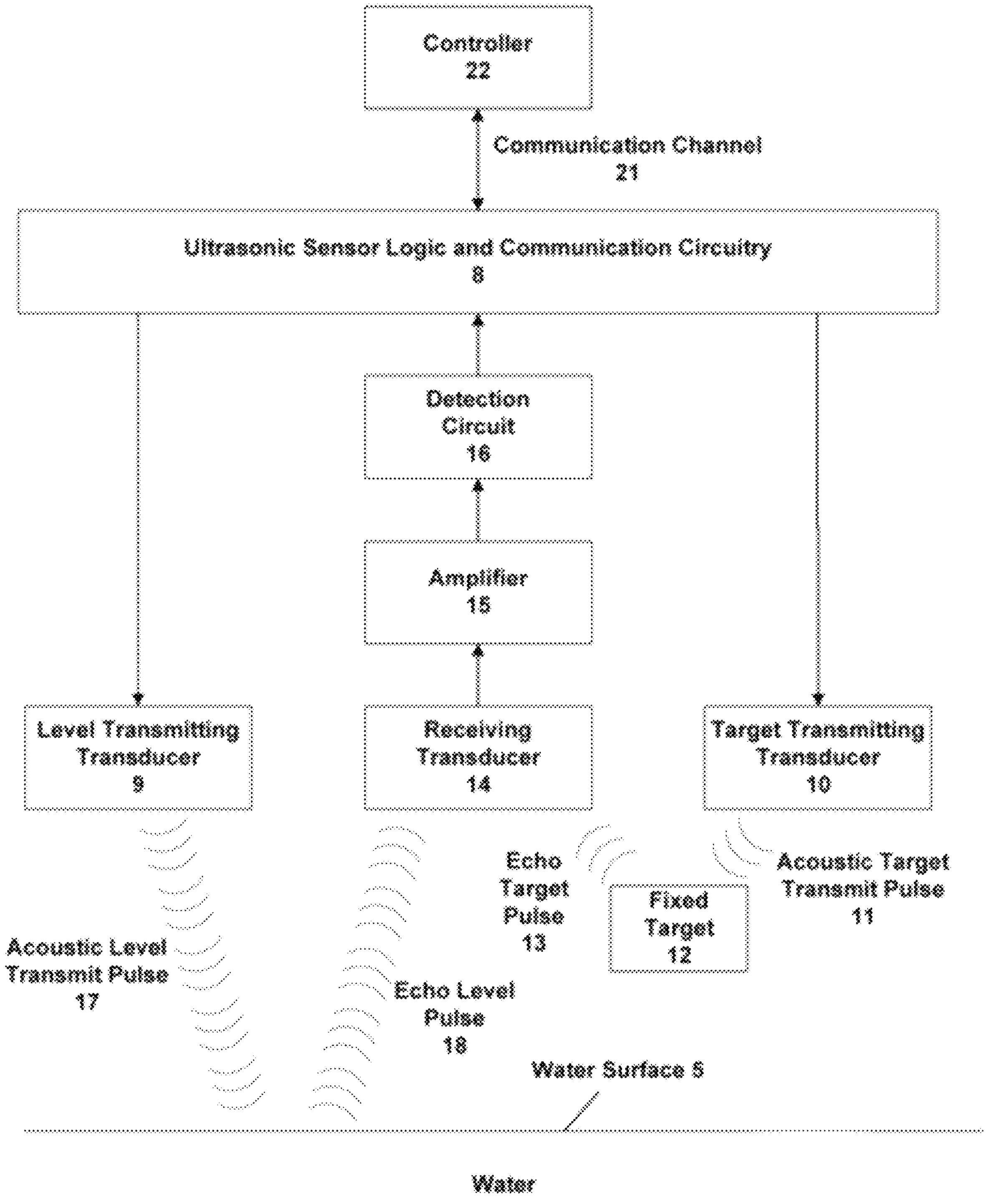
FIG. 2 is a schematic block diagram illustrating an improved boiler water level monitoring and control system employing the teachings of this invention.

FIG. 2 is a schematic block diagram illustrating an improved boiler water level monitoring and control system employing the teachings of this invention. In operation, the ultrasonic sensor portion of the system transmits a sound pulse from a transducer, and an echo is reflected back. The echo is detected by a receiving transducer, and the time is measured from when the pulse was transmitted until when the echo is detected. The sensor then used a known speed of sound to determine the distance of the liquid surface from the transmitting and receiving transducers. This level measurement is then communicated to the controller. A system utilizing the teachings of this invention could operate with a single transducer acting as a transceiver. However, a transceiver system may have difficulty measuring a target at as close a distance to the transducer as a system utilizing separate transmitting and receiving transducers. The configuration shown in FIG. 2 utilized a separate transmitting transducer and receiving transducer, so it can detect targets at closer distances. Someone skilled in the art could use any number of transducers and still fall within the true spirit and scope of this invention.

Depending on the accuracy desired for the target distance measurement, there are many ways to determine a known speed of sound. An approximate average speed of sound for the gaseous environment could be known and used. To improve the accuracy of the target distance measurement, parameters that modify the speed of sound and also change during operation, such as temperature, can be measured during operation, and the updated value of that parameter can be used to calculate a better speed of sound in real time. An even more accurate speed of sound can be determined by using a target positioned at a fixed distance from the transducer to measure the speed of sound. This fixed target could be placed in line with the sound pulse that is measuring the distance to the liquid surface, as is shown in U.S. Pat. No. 4,210,969 by Frank Massa dated Jul. 1, 1980. However, this method may not work well in a small space over the short distances required. In the system shown in FIG. 2, a separate transducer is used to transmit a sound pulse to the fixed target for very accurately measuring the speed of sound in the hostile gaseous environment.

Referring more particularly to FIG. 2, the ultrasonic sensor logic and communication circuitry 8 accurately measures the distance to the water surface 5. It sends an electrical drive signal to the level transmitting transducer 9, which is mechanically mounted so that the position of the radiating surface of the transducer is known. The drive signal can be any type of electrical signal that will activate the transducer to transmit a sound pulse. For example, it could be a voltage tone burst at a frequency in the vicinity of the resonance of the transducer. Because of the short distances that are being measured, a preferred drive signal could be an impulse-type voltage spike that has a small enough pulse width to ensure that the energy spectrum in the signal is higher in frequency than the resonant frequency of the transducer. This will cause the transducers to transmit a short acoustic tone burst at its resonant frequency. This will have the additional advantage that as the resonant frequency of the transducers changes due to the large variation of temperature during operation, the electronics will not have to vary the frequency of the electrical tone burst to match the changing resonate frequency of the transducer. The level transmitting transducer 9 then converts the electrical tone burst to an ultrasonic acoustic level transmit pulse 17, which travels to the water surface 5. The echo level pulse 18 is reflected from the water surface 5 and travels to the receiving transducer 14, which converts the acoustic pulse to an electric tone burst. This transducer is also mounted so that the position of its radiating surface is known. It is important that the positions of radiating surfaces of the transmitting transducers and the receiving surfaces of the receiving transducers in the system are known in order to compute the distance to the water surface 5. If the radiating surfaces and receiving surfaces of the transducers are placed in the same planes, it makes this measurement easier. The received signal is amplified by amplifier 15 and detected by detection circuitry 16. The ultrasonic sensor logic and communication circuit 8 measures the time from when the electric tone burst was sent to the level transmitting transducer 9 to when the echo level pulse 18 was detected. It then used the known speed of sound to calculate the distance to the liquid surface 5.

To determine a more accurate speed of sound, the ultrasonic sensor logic and communication circuitry 8 sends a signal to cause the target transmitting transducer 10 to send an acoustic target transmit pulse 11 to the fixed target 12. Both the target and the transducer are mounted so that their positions are known. The echo transmit pulse 13 reflects from fixed target 12 and is detected by the receiving transducer 14. This signal is then processed through the amplifier 15 and detection circuit 16. The ultrasonic sensor logic and communication circuitry 8 will then measure the time it took the acoustic transmit pulse 11 to travel the entire path, first to the fixed target 12, and then for the echo target pulse 13 to travel to the receiving transducer 12. Since the entire acoustic path length is known, the ultrasonic sensor logic and communications circuitry 8 can calculate the speed of sound over the acoustic path. This value is then used to accurately determine the level of the liquid surface 5.

Typically, the speed of sound is so fast that, for the distances of the acoustic paths, many measurements can be made per second. The water levels in the boiler during operation only move up or down a small amount per second. This allows the system to alternate between fixed target measurements and liquid level measurements many times each second. This rapid measurement time allows the system to update the speed of sound measurement faster than the dynamic changes in the speed of sound occur within the hostile gaseous environment because of the rapid changes in steam content and temperature. This makes each water level measurement accurate. In addition, the system can also average the water level measurements in various ways. For example, by averaging only a small number of echoes, the accurate instantaneous motion of the liquid can be reported. By averaging a large number of echoes, a true long-term average level would be reported.

The ultrasonic sensor logic and communication circuitry 8 is connected to controller 22 by communication channel 21. The ultrasonic sensor logic and communication circuitry 8 will send liquid level measurement information to the controller 22. If the liquid level falls below LWCO, controller 22 can sound alarms, shut off the heating tubes in the boiler, or take any other actions desired. Based on the value of the liquid level, controller 22 can add water if it is low or take any desired action if it is too high. The controller 22 can also have access means that will allow an operator to change settings in either the controller 22 or ultrasonic sensor logic and communications circuitry 8. By utilizing communications channel 21, different operational aspects of the whole system can be contained in either the controller 22 or the ultrasonic sensor logic and communication circuitry 8.

The total acoustic path lengths from the target transmitting transducer 10, to fixed target 12, to receiving transducer 14 can be different for any given boiler. It is important that the highest required water surface level 5 of FIG. 1 be accurately measured, which usually will be the level where high level alarm level is set. Therefore, it is also important that this water level is below the location of fixed target 12.

Once the liquid level reaches the location of fixed target 12, the accuracy of the level sensor will decrease.

The transducers that are used in this inventive ultrasonic boiler water level monitoring and control system can be of many types, including flexural transducers, half wavelength transducers, or quarter wavelength transducers. However, they should be capable of withstanding the hostile gaseous environment in which they have to operate. For boilers, they should be able to withstand the corrosive steam environment, the maximum temperatures and pressures of the boiler, and they should be able to be submerged in the dirty water of the boiler without being damaged. The preferred embodiment employing the teachings of this invention shown in these figures describe systems ideal for a certain type of boilers commonly used in the industry. This boiler has a maximum temperature of approximately 400° F. and a maximum pressure of approximately 150-200 psig. However, it would be straightforward for one skilled in the art to use the teachings of this invention to design a system that would function in boilers that use higher temperatures and/or pressures, or would operate in different hostile environments other than saturated steam in air.

Figure 3:
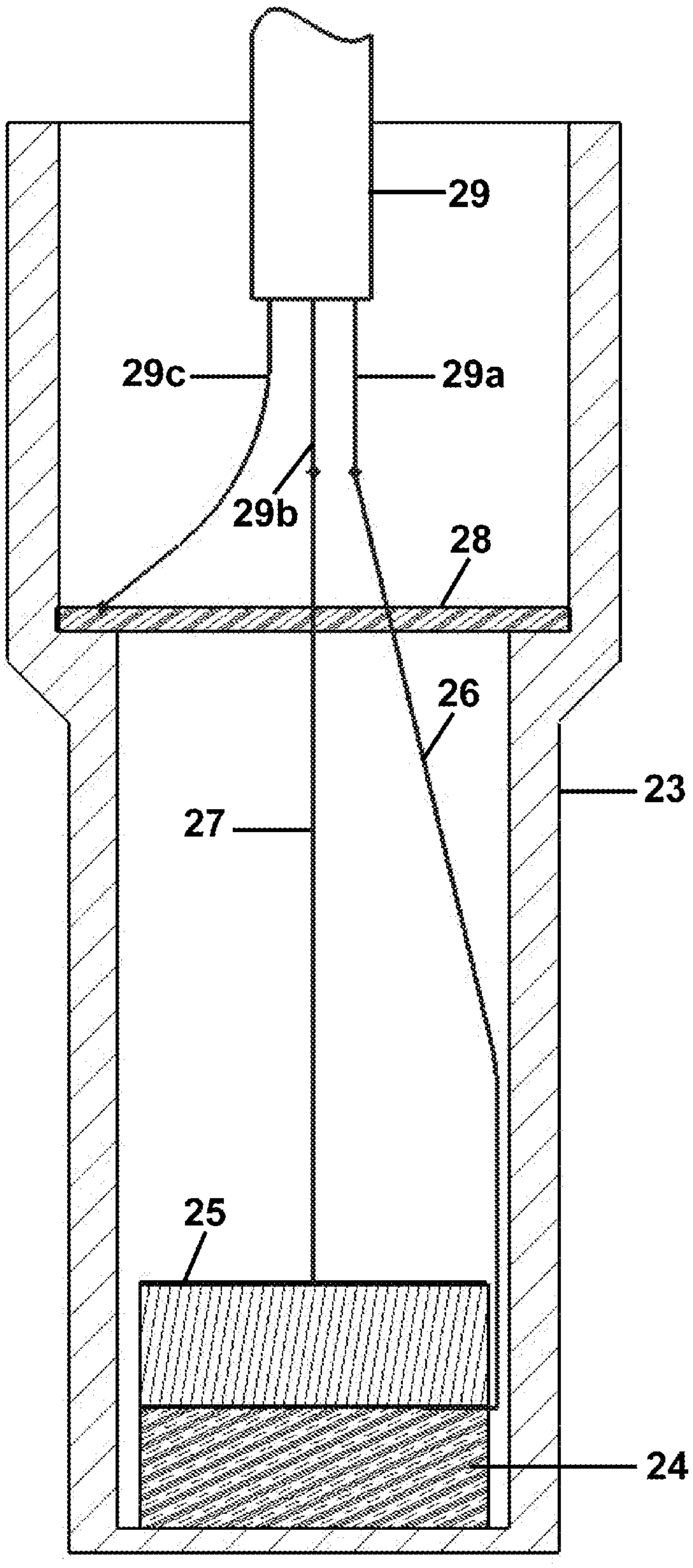
FIG. 3 is a schematic cross-sectional representation of an ultrasonic transducer employing the teachings of this invention.

FIG. 3 shows a cross-section of one preferred embodiment of a transducer employing the teachings of this invention. This is a quarter wavelength transducer. A more detailed description of the operation of this type of transducer is contained in U.S. Pat. No. 3,928,777 by Frank Massa dated Dec. 23, 1975, and U.S. Pat. No. 8,085,621 by Donald P. Massa dated Dec. 27, 2011. The latter patent also describes the operation of half wavelength transducers, which also could be used for this application. The problem with these and other state-of-the-art transducers is they are not usually designed to operate in the hostile environment of steam boilers. Particularly, the materials used will not survive the high temperatures and pressure or the corrosive environment of the steam and water of the boiler.

The cross-section of the transducer in FIG. 3 contains a housing 23. The transducer will have pressure as high as approximately 150-200 psig on its outside surface, but will have only 0 psig inside, so the wall thickness is made thick enough to withstand the maximum pressure. Inside the transducer is a piezoelectric ceramic 25 made from PZT-5 material. This material has the highest Curie temperature of all of the common piezoelectric ceramics, and it will not be harmed by temperatures as high as 400° F. If a design is needed for a higher temperature, there are a number of specialized piezoelectric ceramics that will operate at higher temperatures, but they are much more expensive. Ceramic 25 is a disc with a 0.355 inch diameter that is radially resonant at approximately 170 kHz. This will produce a narrow radiation pattern of sound that is approximately 17°. This narrow beam angle is preferable for this type of ultrasonic echo ranging. In addition, the maximum diameter of the transducer housing is approximately 0.75 inches. Because the size of the housing should be small enough to fit into the required spaces, it is necessary that the diameter of the transducer not be much larger than this for this application. Ceramic 25 has silvered electrodes on its upper and lower surfaces, and wires 26 and 27 are soldered onto these surfaces to make electrical connections to them. Disc 24 is also 0.355 inches in diameter and is cemented coaxially to ceramic 25. It should be made of a material that can readily withstand heat of 400° F. and has a coefficient of heat expansion that is low and similar to that of the PZT-5 ceramic. That means that the two materials will not move very much over the temperature range of approximately 40° F. to 400° F. A material such as makor will meet this requirement. The speed of sound in makor is such that the 0.125 inch thickness of disc 24 makes it a quarter wavelength at 170 KHz. By making the quarter wavelength of the makor the same frequency as the resonant frequency of ceramic 24, the transducer will have high sensitivity at this frequency of operation. The disc 24 is also cemented to the flat surface of the housing 23, which has a thickness as thin as possible to minimize its effect on the quarter wavelength frequency of the makor disc 24. In order for the transducer assembly to be able to operate at temperatures as high as 400° F., a high temperature cement should be used for this total assembly. Because the ceramic 25 and makor disc 24 have such a low coefficient of thermal expansion, most metals or strong high-temperature plastics would move much more over the temperature range than the ceramic and makor discs, which could severely damage or break the cement joints. The transducer housing should be made of a material that will also have a low coefficient of thermal expansion. Materials such as Kovar or Invar will meet this requirement. In this embodiment, housing 23 is made from Invar. To make the outside of the transducer able to withstand the hostile environment, it is plated with a corrosive resistant material such as nickel or chrome. An electrically conductive washer 28 is inserted onto the ridge where the diameter increases near the top of housing 23, and makes an electrical connection to it. A twisted pair shielded cable 29 comes into the top opening of housing 23, and the two conductors 29*a* and 29*b* are soldered onto wires 26 and 27. The shield 29*c* is soldered onto washer 28. Therefore, the final transducer assembly can transmit or receive electrical signals from the transducer assembly through cables 29, and the ceramic 25, along with open conductors 26, 27, 29, 29*a*, 29*b*, and 29*c*, are all shielded to prevent electromagnetic noise pickup.

Figure 4:
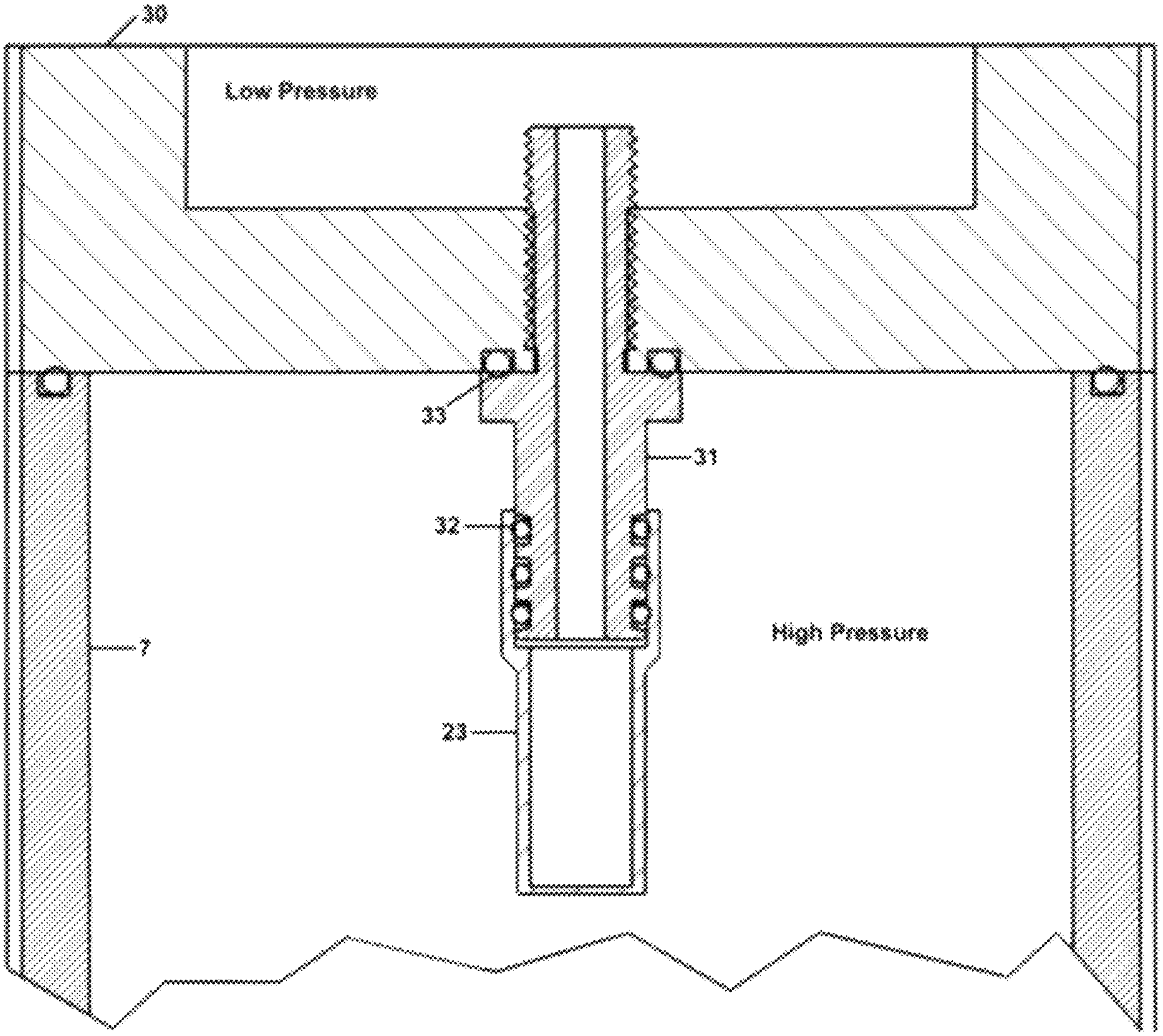
FIG. 4 is a schematic cross-sectional representation showing how an ultrasonic transducer, such as shown in FIG. 3, could be mounted into a high-pressure water level sensor housing, such as shown in FIG. 7.

FIG. 4 is a schematic cross-sectional view showing how each of the transducers are mounted onto pressure flange 30. For better clarity, the inner portions of the transducer are not included, and only housing 23 of the transducer is shown. There are several things that should be accomplished by the mounting. First, the transducer should be mounted in a manner to avoid leakage between the high-pressure air and water inside housing 7 and the low-pressure air inside the transducer and above the pressure flange 30. In addition, the structure should not produce detectable acoustic cross-talk between the transmitting transducers and the receiving transducers. When it transmits, most of the acoustic energy travels out of the radiating face of the transducer into the gaseous environment. However, a small amount of acoustic energy will get into the metallic housing 23. If this sound is transmitted into the high-pressure flange 30, it could travel to the receive transducer and couple into its housing 23. This acoustic cross-talk could be picked up by the receiving transducer. If the cross-talk signal is detectable relitive to the level of the received acoustic echoes, it would be difficult for the system to accurately detect the arrival time of the echoes.

Looking at FIG. 4, the water level sensor housing 7 is attached to the high-pressure flange 30 with an o-ring seal ensuring there is no pressure leak. The transducer is attached to a mounting plug 31, which should be made from a material that can withstand the harsh environment, stiff enough to withstand the pressure, not expand and contract too much over the temperature range, and have high attenuation of ultrasonic sound. A number of materials could meet these requirements. The material chosen to make the mounting plug 31 is 25% glass-filled Teflon. A tapped hole was machined into the high-pressure housing 30, and the top cylinder of mounting plug 31 is threaded, so the plug can be screwed into the hole until o-ring 33, is compressed. The larger cylinder diameter on the lower portion of mounting plug 31 is an interference fit with the internal diameter of the opening in the transducer housing 23. Three o-rings 32 are also placed into grooves in mounting plug 31. All of the o-rings should be able to withstand the hostile environment and be acoustically dampening. Materials such as AFLAS and silicone will meet these requirements. This arrangement mechanically holds the transducer in place on the flange 30, and the o-rings seal the mounting so that there is no pressure leak, and the assembly is waterproof. This construction also alleviates the acoustic cross-talk between the transmitting transducers and the receiving transducers.

Figure 5A:
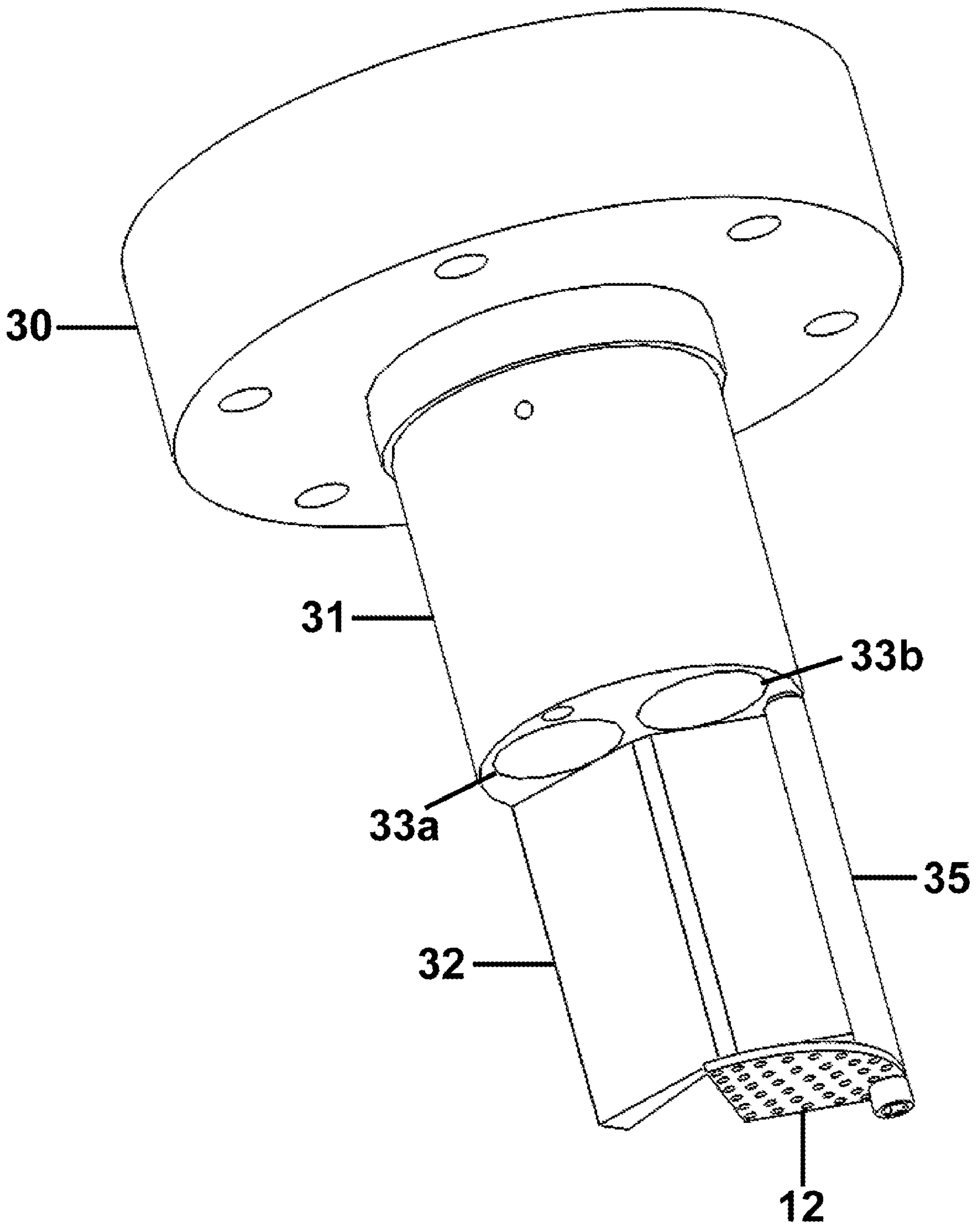
FIG. 5A is an isometric illustration showing the mechanical structure of an embodiment of a part of the high-pressure ultrasonic portion of the block diagram of FIG. 2.
Figure 5B:
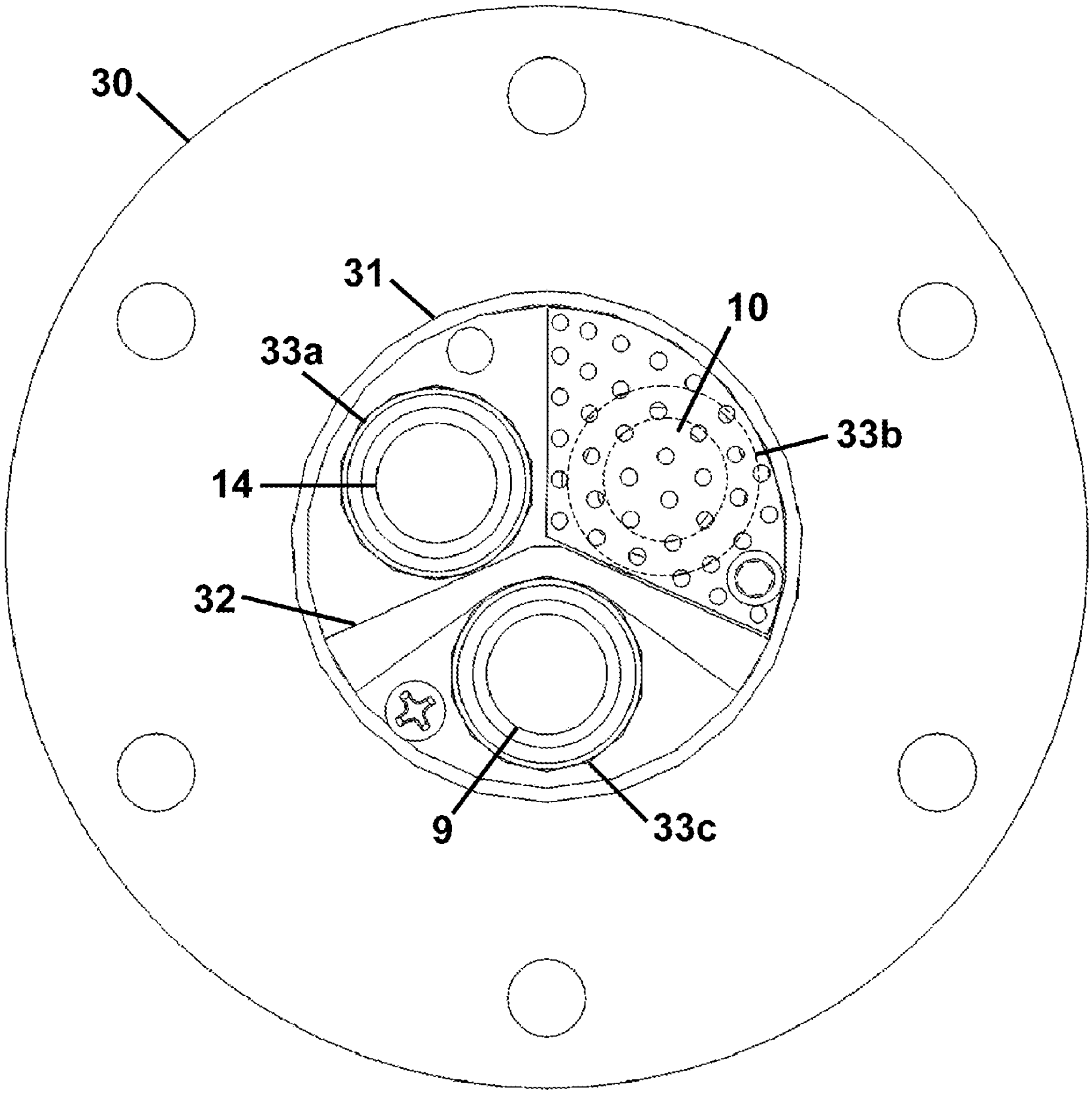
FIG. 5B is a drawing looking at the end view of the structure shown in FIG. 5A.

FIG. 5A is an isometric illustration of a preferred embodiment of a portion of the ultrasonic portion of FIG. 2 showing the locations of the ultrasonic transducers and the fixed target. This is part of the structure of FIG. 6, which is designed to mount into the housing of FIG. 7. FIG. 5B is a drawing looking at the end view of the structure in FIG. 5A. The pressure flange 30 is designed to mount onto the high-pressure water level sensor housing 7 shown in FIG. 7. Attached to flange 30 is a cylindrical transducer enclosure 31, which contains three holes 33*a*, 33*b*, and 33*c* that surround transducers 9, 10, and 14. Three transducers are mounted onto flange 30 in the manner shown in FIG. 4. The transducer enclosure 31 then slides over the three transducers 9, 10, and 14, and it is secured onto flange 30. The transducer enclosure 31 should be made from a material that can withstand the hostile environment, not expand and contract too much over the temperature range and have high attenuation of ultrasonic sound. A number of materials have these properties. For this embodiment 25% glass-filled Teflon was chosen. The radiating and receiving surfaces of the transducers are recessed into the holes. Even though the transducers are directional, a small amount of sound can radiate sideways and could be picked up by the receiving transducer and interfere with the detection of echoes in the same manner as the cross-talk discussed regarding FIG. 4. Because the faces of the transducers are below the opening of the holes in the transducer enclosure 31, sound radiating sideways would be blocked and not detected by the receiving transducer.

An acoustical isolation fin 32 is attached to transducer enclosure 31. This could be a separate structure, or it could be fabricated to be part of transducer enclosure 31. A fixed target 12 is positioned over hole 33*b* that encloses the target transmitting transducer 10. It is held in place by rod 35. The acoustic isolation fin 32 is longer than rod 33, even though it does not look like it is in FIG. 5 due to the angle of the view. As can be seen from both FIG. 5A and FIG. 5B, target transmitting transducer 10 is located in hole 33*b* and receiving transducer 14 is located in hole 33*a*. Both are on one side of the acoustical isolation fin 32. Level transmitting transducer 9 is in hole 33*c* on the other side of the acoustical isolation fin 32.

In operation to measure the speed of sound, ultrasonic sensor logic and communications circuitry 8 from FIG. 2 will cause the target transmitting transducer 10 to generate an acoustic target transmit pulse 11. It will reflect from fixed target 12, and echo target pulse 13 will travel to receiving transducer 14. Ultrasonic sensor logic and communication circuitry 8 will then calculate the speed of sound in the manner previously discussed. Then the level transmitting transducer 9, located in hole 33*c*, will be activated to produce acoustic level transmit pulse 17, which will travel to the water surface 5 and be reflected. Echo level pulse 18 then travels to receiving transducer 14 and is detected. The water level will then be calculated using the speed of sound that was just measured, as has been previously discussed.

If the acoustical isolation fin 32 had not been in place, a portion of the sound from level transmitting transducer 9 could partially insonify fixed target 10 and reflect a false echo that travels to receiving transducer 14. This false echo could interfere in obtaining accurate liquid level measurements in the same manner as cross-talk would, as previously discussed.

Figure 6:
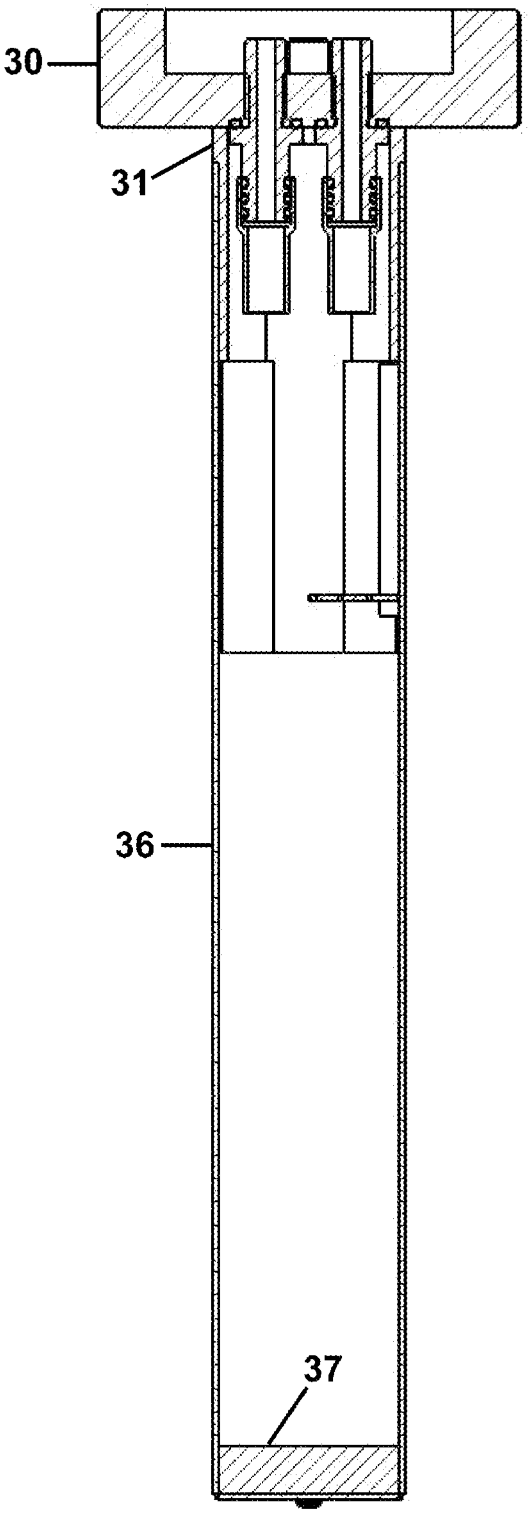
FIG. 6 is a cross-sectional illustration of the entire high-pressure portion of the embodiment of ultrasonics of the system shown in the block diagram of FIG. 2, designed to mount into the housing of FIG. 7.

FIG. 6 is a cross-sectional illustration showing the entire high-pressure portion of the ultrasonic system. The top portion shows the mechanical structure illustrated in FIG. 5A and FIG. 5B. Stilling tube 36 slides over the structure and fits into the step on the side of transducer enclosure 31. It is held in place by fasteners, such as screws. It can be made of any material that will withstand the hostile environment, such as copper, and it should be long enough so that when mounted into water level sensor housing 7, the opening of the tube is further away from the transducer than the water level at LWCO.

The end of tube target 37 is attached to stilling tube 36. It contains openings that will allow water to enter the stilling tube, but the openings are small enough to keep out any large debris that might be contained in the boiler water. Small openings are also placed in the top portion of stilling tube 36 in the vicinity of where it is mounted to transducer enclosure 31. These openings will allow the water in water level sensor housing 7 to flow into the stilling tube 36, so that the water level will be the same in both. However, it could act as a low-frequency mechanical filter if the water level is moving up and down quickly. Stilling tube 36 will also channel the acoustic pulses and keep them inside its inner surface. Therefore, the acoustic pulses won't be able to reach the inner surface of the water level sensor housing 7 and cause false reflections. The inside surface of the tube should be smooth so that it does not reflect any acoustic pulses back to the receiving transducer. During operation, the sensor will be able to continuously measure the level of water inside the stilling tube 36. If the water level drops below the end of the stilling tube, the acoustic level transmit pulse will reflect from the end of tube target 37. Since this is below the level of LWCO, the system will enter an alarm condition and the boiler will be turned off. This will assure an echo is detected even if the sensor housing is empty.

Figure 7:
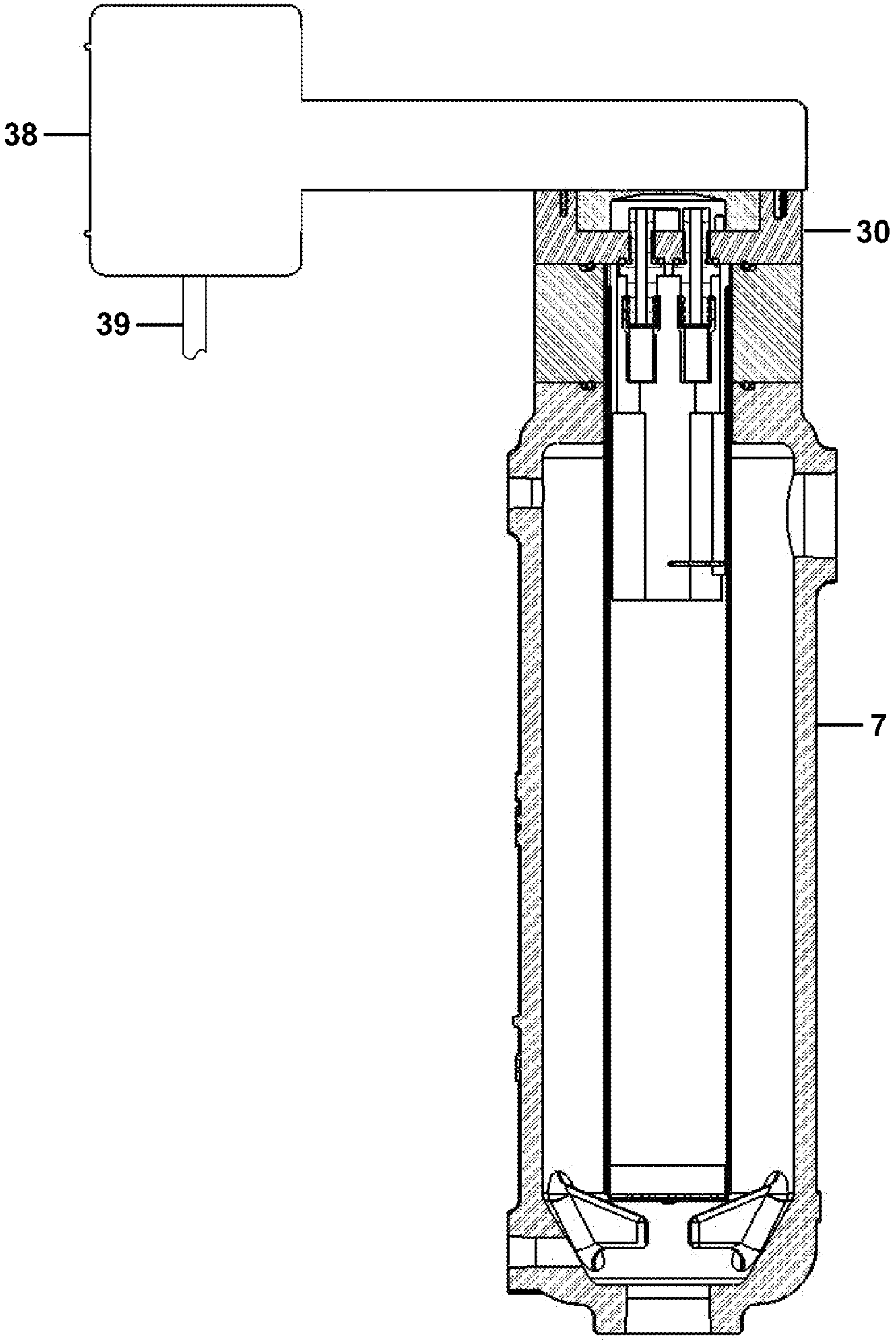
FIG. 7 is a cross-sectional illustration of the structure of FIG. 6 mounted onto a typical high-pressure water level sensor housing currently used on boilers.

FIG. 7 is a cross-sectional illustration of the high-pressure portion of the ultrasonic system shown in FIG. 6 mounted onto a typical high-pressure water level sensor housing 7 currently used on boilers. The cables from the level transmitting transducer 9, the target transmitting transducer 10, and the receiving transducer 14, can be fed out of the top of the pressure flange 30 and be brought into level sensor electronics box 38, which contains the components of amplifier 15, detection circuit 16, and ultrasonic sensor logic and communication circuitry 8. It is preferred to mount this at a distance and to the side of the water level sensor housing 7 to reduce the heat transfer from housing 7 to the electronic components. Cable 39 provides the communication channel 21 between ultrasonic sensor logic and communication circuitry 8 and controller 22. It also provides electrical power to operate the circuits contained in level sensor electronics box 38.

A boiler controller suitable for use with embodiments described herein is described in PCT Patent Application No. PCT/US2022/039338, filed on Aug. 3, 2022 and entitled "BOILER CONTROLLER," which is herein incorporated by reference in its entirety.

As noted above, systems according to the invention can also be used in other types of hostile environments. These can include environments with temperatures and/or pressures unfit for sustained human habitation and environments hot enough for water to produce steam, among others. Environments that exceed about 300 or 400 degrees Fahrenheit and/or exceed 100 or 150 psig are contemplated.

While a few specific embodiments of the present invention have been shown and described, it should be understood that various additional modifications and alternative constructions may be made without departing from the true spirit and scope of the invention. For example, the non-contact distance measuring system that is described as a preferred embodiment of this invention uses ultrasonic acoustic transmitted and reflected energy pulses, the scope of this inventive system should not be limited to the use of ultrasonic or even sonic energy. The teachings of this invention could be used in systems that utilize other types of energy pulses, such as radar and laser. Therefore, the appended claims are intended to cover all such equivalent alternative constructions that fall within their true spirit and scope.

We claim:

1. In a distance measuring system, electronic means and electroacoustic hardware means, said electroacoustic hardware means capable of operating in high-pressure and/or high temperature, said electroacoustic hardware containing transmit transducer means, mounted in a first known location, for radiating an acoustical signal into a gaseous environment after receiving a transmit excitation signal from said electronic means, receiving transducer means, also mounted in the first known location, for receiving an echo from said acoustical signal after it reflects from an upper surface of an object or substance in the gaseous environment, and turning said acoustical signal into an electronic signal, said electronic means having means capable of detecting said received echo electronic signal and means to measure a time from when said transmit excitation signal was sent until when said echo signal was received, and means for calculating a location of the reflecting object or substance using a known location of the transmit transducer means and the receiving transducer means and a speed of sound in the high-pressure and/or high temperature environment.

2. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and wherein the ultrasonic transmitting element portion and the ultrasonic receiving element portion are mounted into a level sensor housing connected to a boiler in a manner that will allow liquid in the boiler to flow into the level sensor housing, such that the liquid level in the water level sensor housing is the same level as the liquid level in the boiler.

3. The apparatus of claim 2 wherein the ultrasonic transmitting element portion and the ultrasonic receiving element portion are part of a same transducer.

4. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and wherein the ultrasonic transmitting element portion is part of an ultrasonic transmitting transducer and the ultrasonic receiving element portion is part of a separate ultrasonic receiving transducer.

5. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and further including a fixed ultrasound-reflecting target positioned within the high-temperature and/or high-pressure environment to allow the processing system to measure a speed of sound within the high-temperature and/or pressure environment.

6. The apparatus of claim 2 wherein the environment is a high-temperature environment that exhibits a temperature that is at least as hot as boiling water under standard atmospheric conditions and wherein steam is present in the environment.

7. The apparatus of claim 2 wherein the environment is a high-temperature environment that exhibits a temperature that can exceed 300 degrees F.

8. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and wherein the environment is a high-temperature environment that exhibits a temperature that can exceed 400 degrees F.

9. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and wherein the environment is a high-pressure environment that exhibits a pressure that exceeds 100 psig.

10. The apparatus of claim 2 wherein the environment is a high-pressure environment that exhibits a pressure that-exceeds about 150 psig.

11. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and wherein the transmitting and receiving element portions include materials with matched thermal coefficients.

12. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and further including a stilling tube through which at least some of the ultrasonic energy passes.

13. An apparatus for measuring a distance from an upper surface of a liquid in a high-temperature and/or high-pressure environment, comprising:

an ultrasonic transmitting element portion constructed to withstand high pressure and/or high temperature, and positioned to direct ultrasonic energy along a downward distance measurement transduction direction, an ultrasonic receiving element portion constructed to withstand high pressure and/or high temperature, and positioned to receive ultrasonic energy from the ultrasonic transmitting element portion reflected back along an upward distance measurement reception direction, a processing system responsive to the receiving element portion and operative to derive a surface distance measurement signal for the liquid based on the ultrasonic energy reflected back from the upper surface of the liquid, and the transmitting element portion and the receiving element portions are mounted in a plug fit with a plurality of o-rings.

14. A method of measuring a distance from an upper surface of a liquid in a high-temperature and/or high-pressure environment, comprising:

providing an ultrasonic transmitting element portion constructed to withstand high pressure and/or high temperature, and positioned to direct ultrasonic energy along a downward distance measurement transduction direction, providing an ultrasonic receiving element portion constructed to withstand high pressure and/or high temperature, and positioned to receive ultrasonic energy from the ultrasonic transmitting element portion reflected back along an upward distance measurement reception direction, transmitting an ultrasonic pulse with the ultrasonic transmitting element portion, ultrasonically measuring the speed of sound in the high-temperature and/or high-pressure environment, receiving reflected energy from the ultrasonic pulse after it has reflected back from a surface of the liquid, and deriving a liquid level measurement for the liquid based on the energy reflected back from the surface of the liquid, wherein the deriving the liquid level measurement uses the ultrasonically measured speed of sound to derive the liquid level measurement.

15. The method of claim 14 wherein the method is performed in an operating boiler.

16. The method of claim 14 wherein the ultrasonically measuring a speed of sound measures the speed of sound from the ultrasonic pulse transmitted to a fixed target.

17. The method of claim 14 wherein the step of transmitting transmits at least some of the ultrasonic pulse through a stilling tube.

18. The system of claim 1 wherein the receiving transducer means is the same instrument as the transmit transducer means.

19. The method of claim 14 wherein the ultrasonically measuring a speed of sound measures the speed of sound from a further ultrasonic pulse from a further ultrasonic transmitting element portion to a fixed target.

* * * * *